United States Patent
Brandon

(10) Patent No.: US 9,913,462 B1
(45) Date of Patent: Mar. 13, 2018

(54) TROLLING DOWN RIGGER

(71) Applicant: L. D. Brandon, Midwest City, OK (US)

(72) Inventor: L. D. Brandon, Midwest City, OK (US)

(*) Notice: Subject to any disclaimer, the term of this patent is extended or adjusted under 35 U.S.C. 154(b) by 0 days.

(21) Appl. No.: 15/686,350

(22) Filed: Aug. 25, 2017

Related U.S. Application Data

(63) Continuation-in-part of application No. 15/406,698, filed on Jan. 14, 2017.

(51) Int. Cl.
| | |
|---|---|
| *A01K 91/08* | (2006.01) |
| *A01K 85/16* | (2006.01) |
| *A01K 95/00* | (2006.01) |
| *A01K 93/00* | (2006.01) |

(52) U.S. Cl.
CPC .......... *A01K 91/08* (2013.01); *A01K 85/16* (2013.01); *A01K 93/00* (2013.01); *A01K 95/00* (2013.01)

(58) Field of Classification Search
CPC ........ A01K 85/00; A01K 85/02; A01K 95/00; A01K 95/005; A01K 91/08; A01K 91/18
USPC .......... 43/44.96, 42.74, 43.13, 43.12, 43.15, 43/42.42, 42.4, 43.2, 42.39
See application file for complete search history.

(56) References Cited

U.S. PATENT DOCUMENTS

| | | | | |
|---|---|---|---|---|
| 2,125,030 | A * | 7/1938 | Ozburn | A01K 85/16 43/42.13 |
| D364,444 | S | 11/1995 | DeCosta | |
| 6,000,166 | A | 12/1999 | Kirkpatrick | |
| D668,735 | S | 10/2012 | Steckelberg | |
| D674,461 | S | 1/2013 | Woller | |
| D687,917 | S | 8/2013 | Poss | |
| 9,265,239 | B2 * | 2/2016 | Ford | A01K 85/16 |
| 2007/0062096 | A1 * | 3/2007 | Roos | A01K 83/00 43/37 |
| 2012/0073182 | A1 | 3/2012 | Poss | |

OTHER PUBLICATIONS

Gander Moutain; "Mann's Little George", retrieved on Jan. 4, 2017 from http://www.gandermountain.com, item !441538.
Card, James; "A Fishing Lure So Effective, It Catches Criticism", Dec. 2, 2014, New York Times. Retrieved on Dec. 29, 2016 from hftps://www.nytimes.com.

* cited by examiner

*Primary Examiner* — Christopher P Ellis
*Assistant Examiner* — Magdalena Topolski

(57) ABSTRACT

A fishing trolling down rigger has a body with left-side and right-side arm attachments, a lure-receiving tail, and arms extending from the left and right sides of the body descend towards weedless, snag-free weights so as to naturally orient the rig with the lure above the bottom of a body of water at a desired distance or height. In at least one embodiment, the arms may be repositioned to form a greater or lesser angle with the body in order to raise or lower the desired height from the bottom at which the lure is positioned at the end of the tail. In another configuration or embodiment, the rig provides for controlled-depth surface fishing.

12 Claims, 5 Drawing Sheets

TROLLING DOWN RIGGER

This application is a continuation-in-part of U.S. patent application Ser. No. 15/406,698, filed on Jan. 14, 2017, by L. D. Brandon. The invention generally relates to devices for fishing near the bottom of bodies of water such as lakes, rivers and oceans.

FIELD OF THE INVENTION

Background of Invention

"Troll fishing", or "Trolling", refers to a method of fishing which involves casting or dropping a lure into a body of water from a boat, and then driving the boat forward so as to pull the lure through the water. The lure is attached to a boom or pole via a fishing line, and the boom or pole is attached to the boat. The driver can pull the lure through the water at an appropriate speed for the different species of fish.

SUMMARY OF EXEMPLARY EMBODIMENTS OF THE INVENTION

A trolling down rigger has a body with left-side and right-side arm attachments, a lure-receiving tail, and arms extending from the left and right sides of the body descend towards weedless, snag-free weights so as to naturally orient the rig with the lure above the bottom of a body of water at a desired distance or height. In at least one embodiment, the arms may be repositioned to form a greater or lesser angle with the body in order to raise or lower the desired height from the bottom at which the lure is positioned at the end of the tail.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Troll fishing or "trolling" is one of the most common and productive methods of fishing. It allows a fisherman to cover a larger area of a lake, river, or ocean, thereby increasing the chances of catching one or more fish. Thus, because some fish feed near the bottom, the present inventor has devised the present invention, at least one exemplary embodiment being disclosed herein for controlled-depth bottom fishing, and another embodiment is disclosed for controlled-depth top fishing. Both embodiments are suitable for use with artificial lures and live bait.

Figure 1:
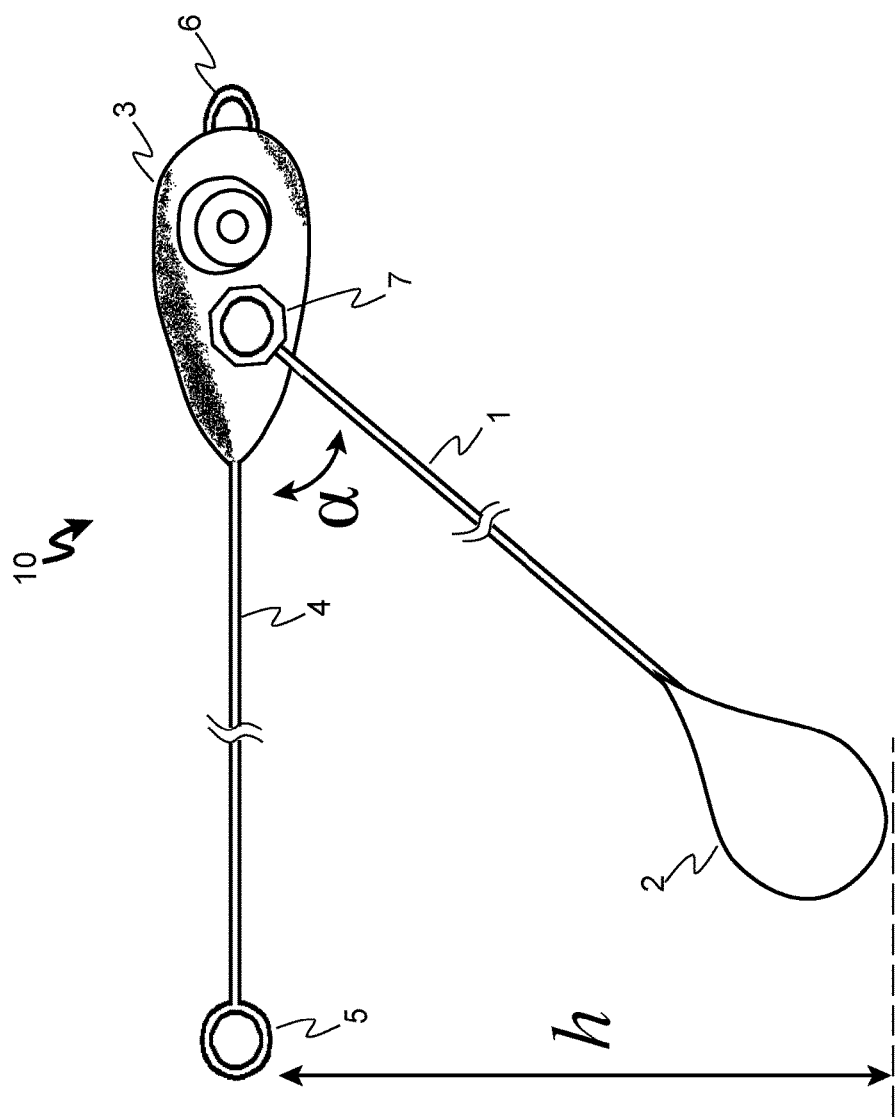
FIG. 1 shows a left-side view of an exemplary embodiment according to the present invention of a trolling down rigger.

Turning to FIG. 1, an exemplary embodiment (10) has a body (3) which connects to a fishing line via a lead eyelet (6), and a tail (4) with a lure eyelet (5) for receiving a lure of the fisherman's choice, such as by a swivel attachment. Further, attached to the body (3) are a right leg (1) and a similar left leg (not shown in this view), to each of which at the lower (distal) end is molded or attached a weight (2) having a shape capable of skidding along the earth at the bottom of a body of water, such as a teardrop, egg or ski shape.

The shape of the weight should be selected to prevent snagging, such as a weedless design, when the rig (10) is moving forward as pulled by line attached to the lead eyelet (6). The size and mass of the weights can vary, depending on the size and weight of the body and the rest of the rig. The body can be solid, or may be hollow, and it may be buoyant in some embodiments to promote upright orientation of the rig with the weights in a relatively downward position.

In one embodiment for inland freshwater fishing (e.g., lakes and rivers), the tail (4) is 1/16" flexible wire about 14" in length, and each leg is constructed of 1/8" rigid wire about 12" in length. The legs are attached to the body using a lock nut (7) and a bolt, such as an Allen head bolt, such that the angle $\alpha$ formed between the legs and the body can be adjusted by loosening and tightening the bolt, thereby setting a height h from the bottom of the body of water for positioning the lure during trolling, which is important for catching bottom-feeding fish under varying conditions.

Figure 2:
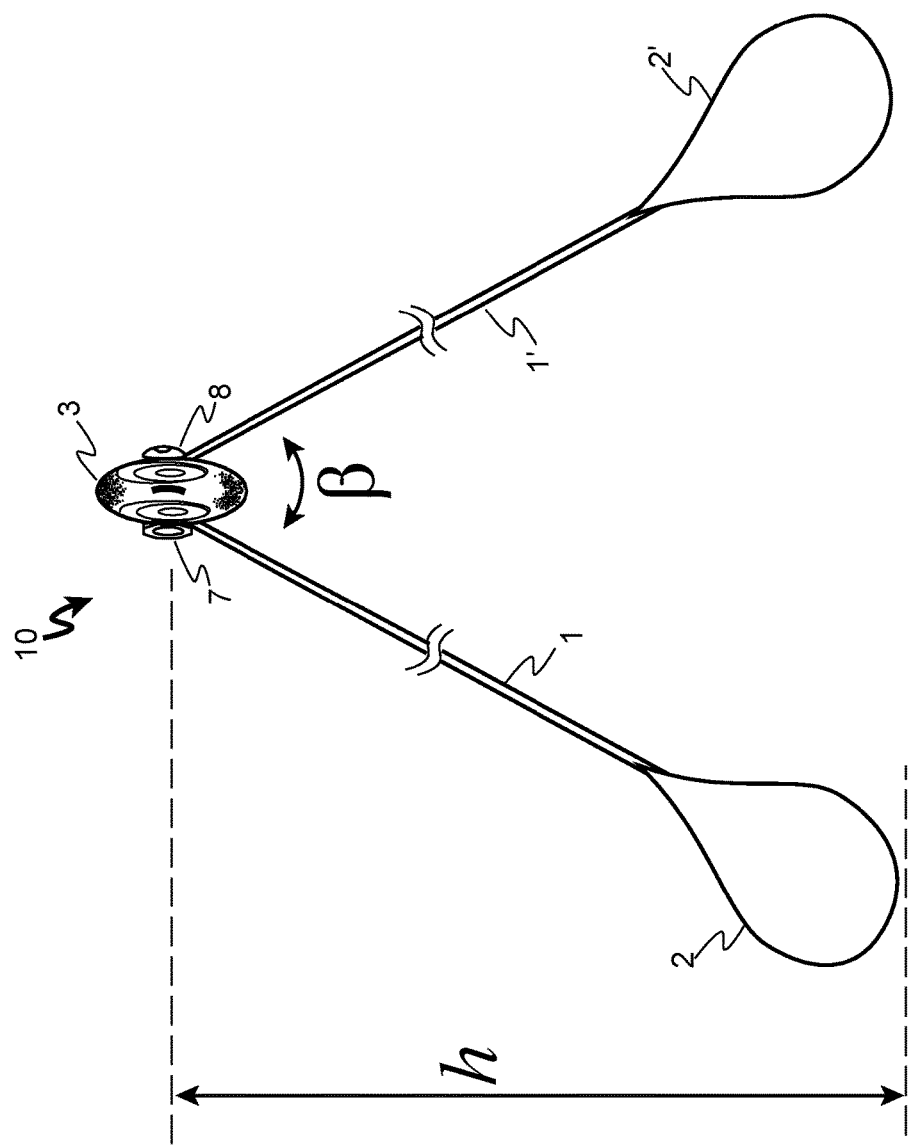
FIG. 2 provides a front view an exemplary embodiment of a trolling down rigger.

Referring now to FIG. 2, the exemplary embodiment (10) of a trolling down rigger is shown from the front, in which the left leg (1') and left weight (2') are visible, and a preferred spread angle $\beta$ between the two legs with the body (3) between them is evident, which promotes stability and a natural vertical orientation as the rig is pulled over uneven terrain of the bottom of the body of water. Also in this view are visible the hex nut (7) and the head of the Allen bolt (8) used to attach the legs to the body and to set the height h of the trolling position.

Figure 3:
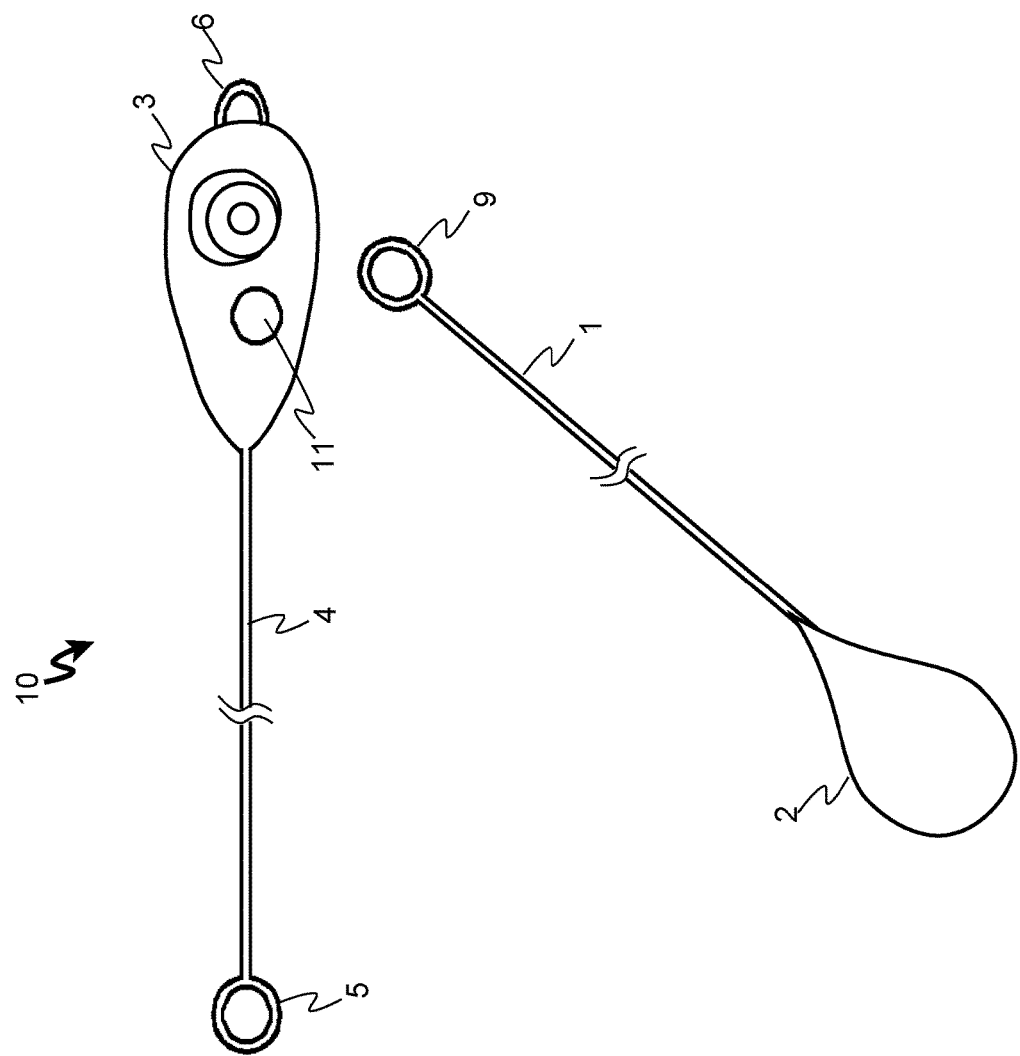
FIG. 3 illustrates the main components of an exemplary embodiment of a trolling down rigger.

FIG. 3 shows the two main components of the exemplary embodiment (10) of a trolling down rigger in a disassembled state for illustration of the attachment ring (9) at the body-end of the left arm (1) opposite of the weight (2). In a preferred embodiment, the shape of the right left is symmetric with the left weight so that the same component can be used either as a left or right leg. Other embodiments may provide different shapes and lengths, of course. The body (3) is provided with an attachment means (11) such as a hole through the body, through which is received a bolt (not shown) or other fastening means (e.g., rivet, brad, etc.). Other means of pivotal fastening may be employed in other embodiments, such as a stud projected from each side of the body onto which a retainer (e.g. press-on nut, thread-on nut, cotter pin, etc.) is placed to capture and secure the attachment ring (9) of each leg.

With an embodiment of the present invention, the fisherman can set the desired height from the bottom of the body of water at which to troll fish with an attached lure without concern that it will sink and snag when the trolling speed falls below a minimum velocity to keep the rig suspended in open water. Embodiments of the present invention may be outfitted with an illumination source for night fishing, and may be useful for catching fish which feed towards the bottom during periods of heat or cold.

Figure 4:
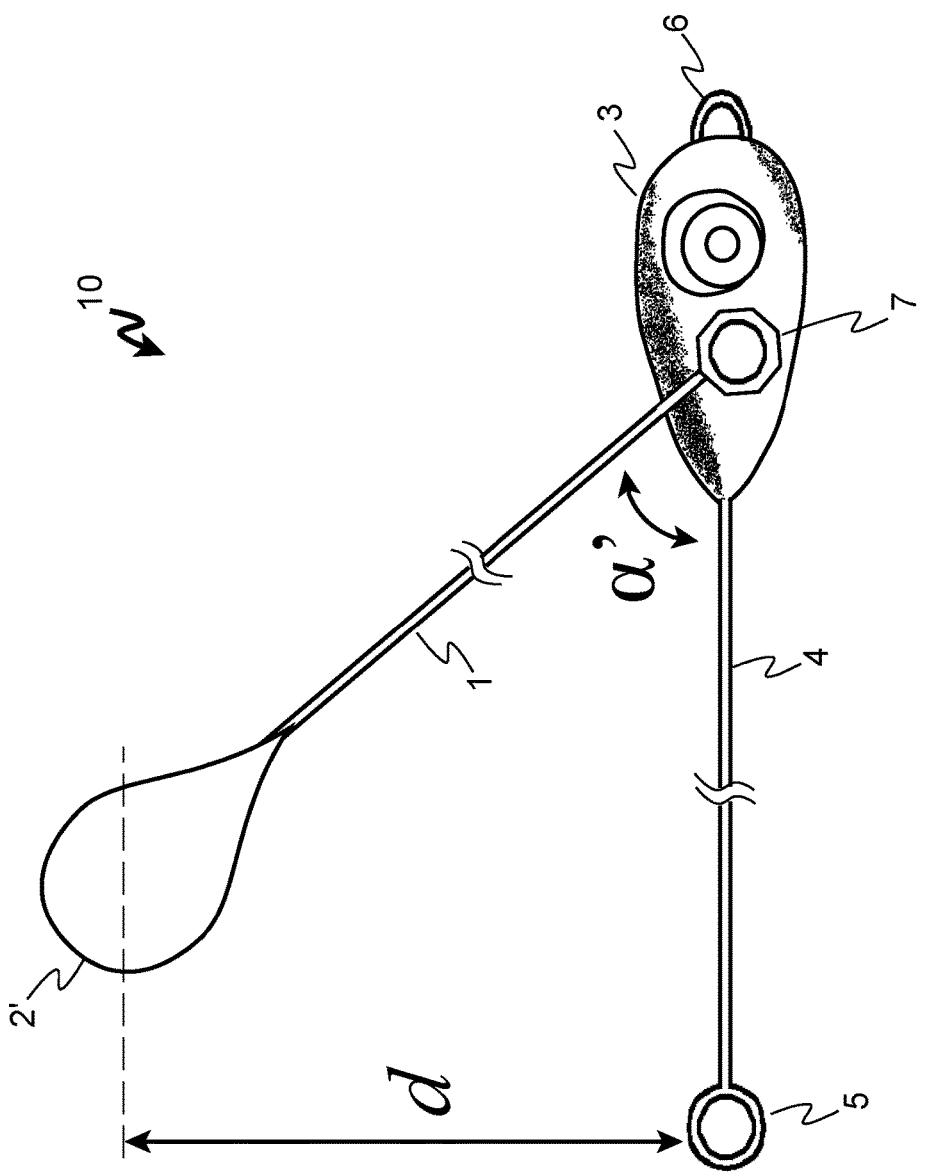
FIG. 4 depicts an alternate embodiment of the down rigger which is useful for surface fishing.

Referring now to FIG. 4, another embodiment according to the present invention is shown for controlled-depth top fishing. This embodiment may actually be realized as an alternate configuration of the controlled-height bottom fishing rig shown in the other figures. In this embodiment, the left arm (1) and right arm (not shown in this view) are adjusted so that they form an upward angle $\alpha'$ with the body (3). And, the weights (2) of FIG. 1 at the distal end of the arms are replaced by floats (2') of sufficient buoyancy to overcome the weight of the rig and the associated lure attached to the eyelet (5). In this embodiment (or configuration), the rig (10) travels with the floats (2') at the surface of the water, and the lure and body are maintained at a controlled depth d below the surface while the rig is pulled forward by the lead eyelet (6). The lengths of the arms (1) and the tail may be similar to those described relative to the bottom trolling embodiment described in the foregoing paragraphs, or may be suitable larger or smaller depending on the type and size of fish for which the user is fishing. The shape of the floats (2) may be similar to the disclosed shapes of the weights, or another suitable shape (e.g., a hull shape) which is streamlined for moving through or across the surface of water with the amount of resistance desired to stabilize the positioning of the lure attached to the eyelet (5).

Improved Embodiment

Following additional experimentation, the embodiment which utilizes two separate arms attached to the body using a bolt and nut has been improved, whereas keeping the nut and but sufficiently tight to prevent the angle α from changing was difficult. The resulting structural improvement also decreased the materials, time and effort needed to assemble a unit.

Figure 5:
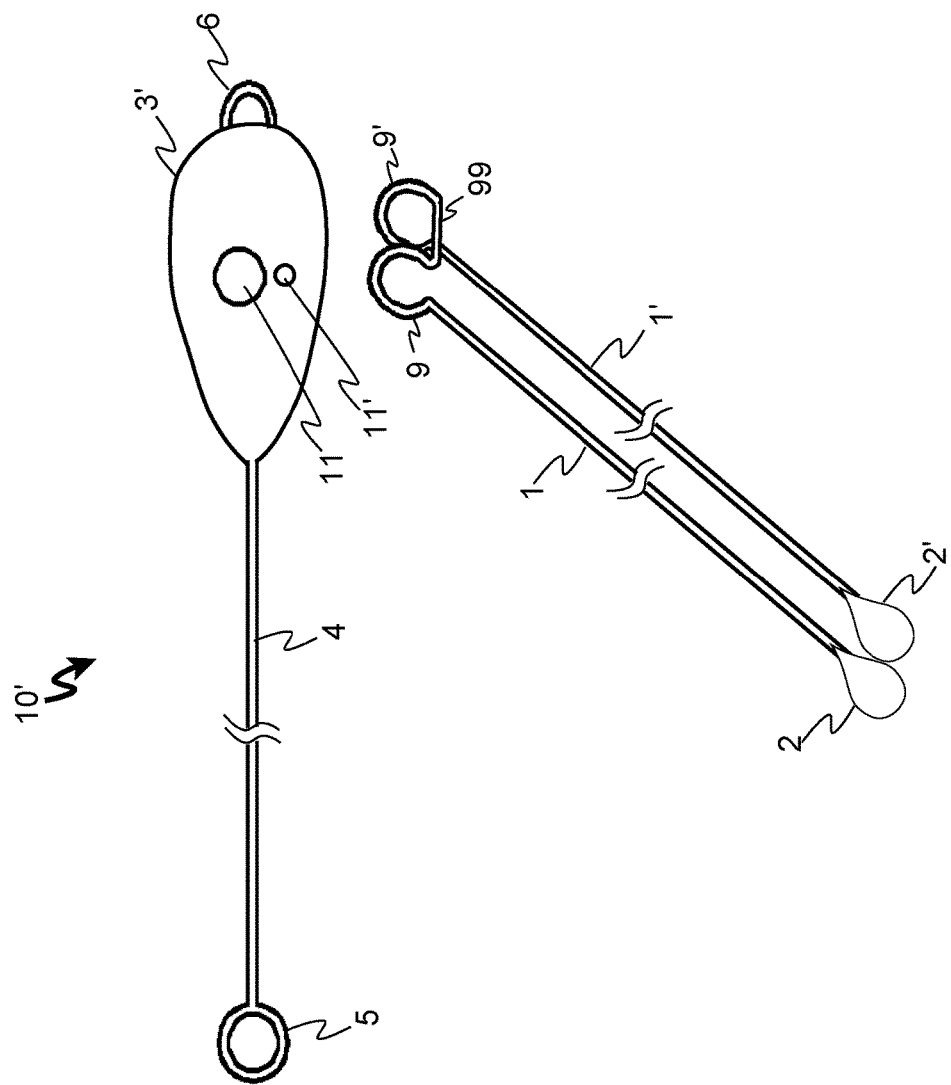
FIG. 5 shows an improved structure and method of manufacture and assembly for another embodiment according to the invention.

As shown in FIG. 5, the body (3) is provided with a first hole (11) suitable for passing a bolt through, as in the other embodiments. Additionally, a second hole (11') is provided near the first hole, of suitable diameter to receive the material from which the legs (1, 1') are constructed, such as a thin, round rod or stiff wire.

The leg assembly is shown separate from the body for illustration purposes, but in practice, it is not in this form separate from the body as it is formed in the process of attaching it to the body. The two legs (1, 1') are part of a single piece of rod or wire which is bent to form two crooks (9, 9') with a new linking section (99) that passes through the second hole (11'). This portion of the unitary leg assembly is captured by the body material, and is indexed by the second hole to prevent it from twisting and loosening the nut-bolt pair, thereby relieving the nut-bold pair from having to resist the twisting. This results in an assembly which does not have the loosening problem of the other embodiment.

The method of assembly and manufacture of this embodiment is also advantageous, in that it requires fewer parts and is quicker to assemble. No bending jig is needed, as the body and the bolt are used for that purpose during the assembly process, such as the following steps:

(1) cut a straight length of rod or wire equal to the sum of the lengths of the two legs (1, 1'), the circumference of the two crooks (9, 9'), and the linking section (99);
(2) pass the other end of the straight rod or wire through the indexing hole (11') to a position with equal lengths of rod extending from both sides of the body (3');
(3) insert a bolt through the main hole (11);
(4) bend the rod on one side of the body to wrap around the bolt and point downwards, thereby creating the first crook (9), first end of the linking section (99), and the first leg (1);
(5) bend the rod on the other side of the body (3') to form the second crook (9'), second end of the linking section (99) captured in the body in the index hole (11"), and the second leg (1');
(6) affix the nut and optionally a washer to the end of the bold;
(7) attach the weights (2, 2') to the ends of the two legs (1, 1'); and
(8) attach the tail (4, 5) and leader eyelet (6).

In this manner, the unitary leg structure (1, 1', 9, 9', 99) is formed during the assembly process, which captures the rod and holds the legs in position using the index hole, thereby preventing it from rotating around the bolt. If the angle α needs to be changed, the leg portions can be bent accordingly without loosening the bolt-nut pair.

SUMMARY

The foregoing exemplary embodiment(s) is/are intended to teach how to make and use the invention, but not to express the limits of the spirit and scope of the invention. In some embodiments, a disclosed singular element may be replaced by a plurality of elements, and vice versa, without departing from the spirit and scope of the invention. Alternative materials from those disclosed in the exemplary embodiments may be employed, so long as the function and intended performance is maintained or improved.

What is claimed is:

1. A trolling down rigger device comprising:
   a body having a main hole and an indexing hole formed through a thickness of the body;
   a fastener received through the main hole;
   a pair of arms formed by a single rod or wire received through the indexing hole, wrapped around two ends of the main hole, with each end of the rod or wire descending from the body;
   a first weight attached to a first end of the rod or wire;
   a second weight attached to the second end of the rod or wire; and
   a lead eyelet, and a tail extending from a rear of the body with a lure eyelet at a distal end of the tail,
   wherein a combined mass of the two arms and the two weights exceed a mass of the body and tail to provide for self-orienting on a bottom surface of a body of water with the lure eyelet positioned at a pre-determined distance above the bottom surface.

2. The trolling down rigger device as set forth in claim 1 wherein the fastener comprises a nut and bolt combination.

3. The trolling down rigger device as set forth in claim 1 wherein the fastener is selected from the group consisting of a brad, a rivet, and a stud.

4. The trolling down rigger device as set forth in claim 1 wherein at least one of the weights is egg shaped.

5. The trolling down rigger device as set forth in claim 1 wherein at least one of the weights is teardrop shaped.

6. The trolling down rigger device as set forth in claim 1 wherein at least one of the weights is ski shaped.

7. A method of manufacture of a trolling down rigger device comprising the steps of:
   forming a body having a main hole and an indexing hole formed through a thickness of the body;
   receiving a fastener through the main hole;
   forming a pair of arms from a single straight rod or wire by:
      receiving the straight rod or wire through the indexing hole, and
      wrapping the rod or wire on each side of the body around two ends of the fastener such that each end of the rod or wire descends from the body;
   attaching a weight to each end of each arm; and
   providing a lead eyelet at a front of the body, and a tail extending from a rear of the body with a lure eyelet at a distal end of the tail;

wherein a combined mass of the two arms and the two weights exceed a mass of the body and tail to provide for self-orienting on a bottom surface of a body of water with the lure eyelet positioned at a pre-determined distance above the bottom surface.

8. The method as set forth in claim 7 wherein the fastener comprises a nut and bolt combination.

9. The method as set forth in claim 7 wherein the fastener is selected from the group consisting of a brad, a rivet, and a stud.

10. The method as set forth in claim 1 wherein at least one of the weights is egg shaped.

11. The method as set forth in claim 7 wherein at least one of the weights is teardrop shaped.

12. The method as set forth in claim 7 wherein at least one of the weights is ski shaped.

\* \* \* \* \*